United States Patent [19]

Byrd, Jr.

[11] 4,103,469

[45] Aug. 1, 1978

[54] REFRACTORY FIBER BLANKET MODULE FOR FURNACE AREAS WITH HIGH GAS VELOCITIES

[75] Inventor: Carlisle O. Byrd, Jr., Houston, Tex.

[73] Assignee: Johns-Manville Corporation, Denver, Colo.

[21] Appl. No.: 757,749

[22] Filed: Jan. 7, 1977

Related U.S. Application Data

[63] Continuation-in-part of Ser. No. 603,391, Aug. 11, 1975, Pat. No. 4,001,996, which is a continuation-in-part of Ser. No. 475,439, Jun. 3, 1974, Pat. No. 3,952,470.

[51] Int. Cl.[2] .......................... E04B 1/80; C04B 43/02

[52] U.S. Cl. .......................................... 52/509; 52/511; 428/99; 428/121; 428/126; 428/235; 428/300

[58] Field of Search ............... 110/1 A, 99 R; 52/404, 52/509, 406, 508, 145, 63; 181/33 G, 33 GA, 33 HB; 432/247, 248, 249, 250, 251, 252; 428/233, 235, 99, 114, 119, 124, 131, 223, 298, 920

[56] References Cited

U.S. PATENT DOCUMENTS

| | | | |
|---|---|---|---|
| 2,355,608 | 8/1944 | Stieger | 52/145 |
| 3,282,578 | 11/1966 | Ulbrich | 432/247 |
| 3,770,557 | 11/1973 | Habeeb | 428/223 |
| 3,892,396 | 7/1975 | Monaghan | 52/506 |
| 3,909,907 | 10/1975 | Davis | 110/1 A |
| 3,990,203 | 11/1976 | Greaves | 428/99 |
| 4,037,751 | 7/1977 | Miller | 52/404 |

FOREIGN PATENT DOCUMENTS

| | | | |
|---|---|---|---|
| 569,210 | 1/1959 | Canada | 428/233 |

*Primary Examiner*—John E. Murtagh

*Attorney, Agent, or Firm*—Robert M. Krone; James W. McClain

[57] ABSTRACT

Modular fiber blanket furnace lining is covered on the "hot face" with a surface layer of cloth made from continuous fibers of metal oxides (such as of alumina-boria-silica composition) to prevent erosion of the underlying fibers by high velocity furnace gases.

12 Claims, 3 Drawing Figures

REFRACTORY FIBER BLANKET MODULE FOR FURNACE AREAS WITH HIGH GAS VELOCITIES

CROSS-REFERENCE TO RELATED APPLICATIONS:

This application is a continuation-in-part of copending U.S. patent application Ser. No. 603,391, filed Aug. 11, 1975, now U.S. Pat. No. 4,001,996, which in turn is a continuation-in-part of U.S. patent application Ser. No. 475,439, filed June 3, 1974, now U.S. Pat. No. 3,952,470. Other continuations-in-part of these parent applications are U.S. patent applications Ser. Nos. 757,750 and 757,748, filed of even date herewith. Another related application is U.S. patent application Ser. No. 757,772, filed of even date herewith.

BACKGROUND OF INVENTION

1. Field of Invention

The present invention relates to modular refractory fiber blanket furnace lining systems.

2. Description of Prior Art

Refractory fiber blankets made from refractory materials such as chromia-alumina-silica, alumina-silica compositions and zirconia compositions have become desirable as furnace insulation because of their ability to withstand high temperatures. The fiber blanket material has been attached in a layered construction arrangment to the furnace wall using attachment structure, as exemplified in U.S. Pat. Nos. 3,523,395 and 3,605,370.

Another approach has been to form modules or blocks of refractory fiber blanket material, as exemplified by U.S. Pat. Nos. 3,832,815 and 3,819,468.

However, in certain areas of the furnaces being insulated, problems were still present. In portions of some stacks and flues, as well as in convection sections of certain types of reformers, gas velocities often far exceed forty to eighty feet per second. Other examples of high temperature equipment are high temperature wind tunnels and mufflers or noise abatement systems for silencing jet engines and gas turbines during repair and maintenance. Gases at these velocities were capable of in effect picking away individual fiber elements from the blankets and thereby eroding the blanket, whether in a module or layered construction, during use.

Further, in areas of the furnaces near burners, or in "target" areas where high velocity burners impinged, flame erosion caused further problems. In addition to high velocity gas erosion, devitrification of the fibers by the flames made the fibers more easily erosible by the gases, further compounding the problem.

Other types of insulation structure, such as fibrous batting, in which the layers were bound together by glue, as exemplified by U.S. Pat. No. 2,454,175, were unsatisfactory for several reasons, for example, ease of installation and repair, cost of fabrication and inadequate ability to withstand high temperatures.

SUMMARY OF INVENTION

Briefly, the present invention is an improvement in refactory fiber blanket lining for a furnace wall and the like to prevent erosion of the fibers in the blanket by furnace gases. A surface layer of cloth formed from fibers of metal oxides is mounted on an inner surface portion, termed the "hot face" in the art, exposed to interior conditions in the furnace. The cloth of the surface layer is preferably formed from cloth of woven continuous fibers of alumina-boria-silica composition and is attached to the "hot face" by being sewn thereto with similar fibers. The refractory fiber blanket lining may be in the form of modular insulating blocks of folded blanket or in the form of a plurality of layers, mounted in a substantially parallel relationship with the wall of the furnace.

Figure 1:
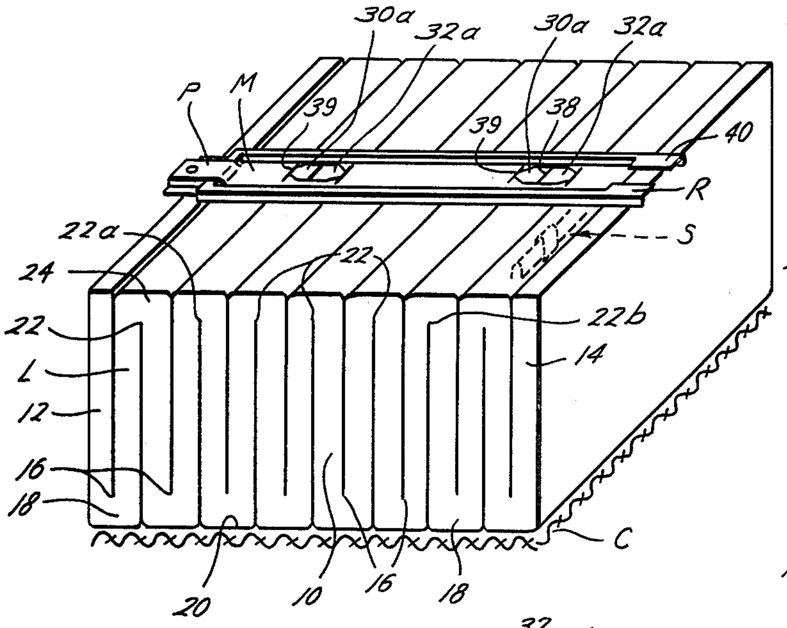
FIGS. 1 and 2 are isometric views of a modular refractory fiber blanket insulating blocks according to the present invention; and, FIG. 3 is an isometric view of layered refractory fiber blanket furnace insulation according to the present invention.

DESCRIPTION OF THE PREFERRED EMBODIMENT:

In the drawings, the letter B (FIG. 1) designates generally an insulating block for lining a wall (not shown), which may be either a side wall or a roof, of a furnace or of some other high temperature equipment such as soaking pits, annealing furnaces, stress relieving units and the like, such as those previously set forth. The insulating block B is preformed from folded insulating blankets, such as a blanket L, for insulating the furnace, with a support S, one of which is shown in phantom, mounted in certain of the folds in the folded blanket and an attachment mounting or channel M for mounting the supports S and the blanket B to the wall.

Considering the blanket L more in detail, such blanket is formed from a suitable commercially available needled ceramic fiber sheet, such as the type known as "CERABLANKET," sold by the Johns-Manville Company, containing alumina-silica fibers or other suitable commercially available refractory fibrous materials. It should be understood that the particular component materials of the ceramic fiber sheet used in the blankets are selected based upon the range of temperatures in the high temperature equipment in which the apparatus is to be installed.

In the block B (FIG. 1), the blanket L is folded into adjacent layers 10 mounted sinuously and extending inwardly and outwardly in such a sinuous manner between a first end layer 12 and a second end layer 14 at opposite ends of the attachment mounting or channel M. Adjacent ones of the layers 10 and those layers 10 adjacent the end layers 12 and 14 form inner folds 16 adjacent inner end portions 18 of the blanket L near an insulation surface 20, or "hot face" as termed in the art, closest to interior conditions in the high temperature equipment. Outer folds 22 are formed between adjacent layers 10 at an opposite and adjacent outer end portion 24 at positions intermediate each of the inner folds 16.

The blanket L is supported at certain of the outer folds 22, designated *22a* and *22b* (FIG. 1) by a support beam 26, details of which are set forth in an alternate blanket embodiment (FIG. 2) of the support S mounted in the folds 22. The support beam 26 is formed from a folded bar of a high temperature-resistant metal or alloy or other suitable material, although other shapes of support beams and materials may be used, as set forth in Applicant's copending parent application referenced above, now U.S. Pat. No. 3,952,470. The support beam 26 is mounted at a center portion *26a* (FIG. 2) thereof within a loop 28 formed at a lower end juncture of suspension arms 30 and 32 of a suspending tab or support tab T of the attachment mounting M. The support beam 26 may be welded, such as by spot welding, and the loop 28 and the suspension arms 30 and 32 welded together for additional strength and support, if desired.

Alternately, the suspending tab T may be formed with a single suspension arm. An opening is formed in the center portion 26*a* of the U-shaped support beam 26, and the single suspension arm inserted to extend through such opening. The portion of the suspension arm extending through the opening is then bent to fit against one side of the support beam and secured to the support beam 26 by spot welding the suspension arm thereto.

In the layers of the blanket L, the fibers of material normally extend longitudinally within the layer. Additionally, however, it should be understood that the fibers of the adjacent layers may be needled together in the manner set forth in detail in allowed co-pending parent appliction Ser. No. 603,391, now U.S. Pat. No. 4,001,996 if desired. As a result of needling, the direction of the orientation of certain of the fibers in the blanket L is changed from the normal longitudinal extension to a position where in adjacent layers are transversely disposed to the remainder of the fibers and extend into other adjacent layers to bind the layers together into an insulating block. In this manner, the perpendicular fibers bind the adjacent lamina or layers of the blanket together, compacting and strengthening the blanket.

Figure 2:
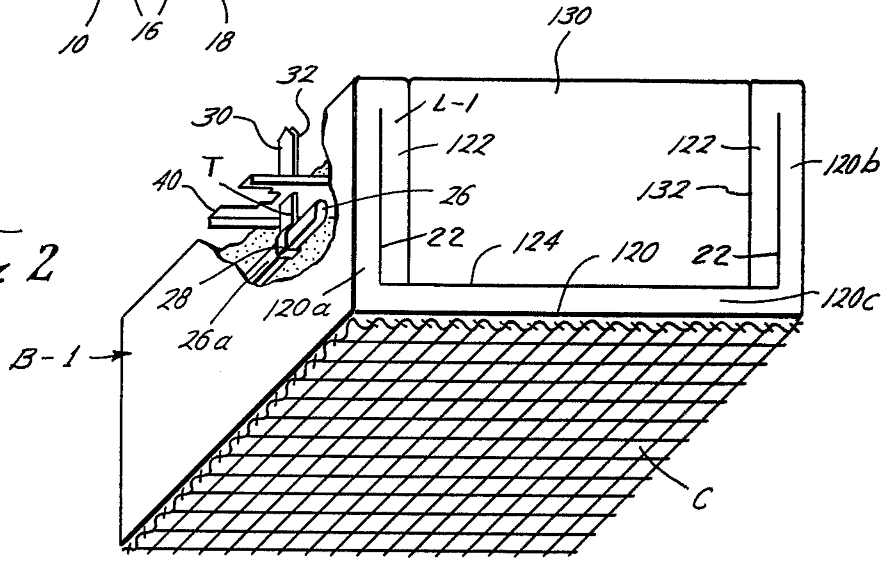

An opening is formed through the outer end portions 24 of the blanket L adjacent the fold 22 receiving the support beam 26 (FIG. 2). The opening so formed extends upwardly through the blanket L from the fold 22 for passage of the suspension arms 30 and 32 through the blanket L.

Mounting lugs 30*a* and 32*a* (FIG. 1), formed at upper ends of the suspension arms 30 and 32, respectively, of each of the support tabs or suspending tabs T extend upwardly through mounting orifices 38 in a central attachment channel or a stringer channel member 40 of the attachment mounting M. The mounting lugs 30*a* and 32*a* are folded downwardly against the stringer channel member so that the block B may be mounted against the wall. The ends of mounting lugs 30*a* and 32*a* may in addition, if desired, be inserted to extend downwardly through mounting orifices 39 in the attachment mounting M so that sharp ends of the tabs T are enclosed beneath the attachment mounting M. The insertion of the ends of the lugs 30*a* and 32*a* through the mounting orifices 39 protects the hands of installers against points or sharp surfaces at the ends and, in addition, further strengthens the connection of the supports to the attachment mounting M.

Additionally, each of the attachment mountings M has an attachment receptacle R formed at an end thereof and an attachment pin member P formed at an end opposite the attachment receptacle R. The attachment receptacle R of the apparatus receives the attachment pin P of an adjacent block of the apparatus, while the attachment pin P extends outwardly beyond the preformed insulation block B to provide access for welding in order to mount the block to the furnace wall. After such mounting, the pin P is fitted into an attachment receptacle R of another adjacent block B.

As has been set forth, in certain areas of high temperature equipment, furnace gases often achieve sufficiently high velocity to carry away individual fibers in the blanket L due to the high velocity gas movement. The problem is further compounded in target areas where burners impinge, causing the fibers to be susceptible to possible devitrification, making the fibers more erosible.

Accordingly, with the present invention, a surface layer C of cloth formed from fibers of metal oxides is attached to the hot face 20 of the block B exposed to interior conditions of the furnace. The cloth of the surface layer C is preferably formed by being woven from metal oxide thread, preferably a continuous filament metal oxide thread which, when woven, yields a ceramic cloth. A suitable cloth, for example, is that woven from the ceramic fibers designated AB-312 of the 3M Company of Saint Paul, Minn. These fibers are continuous filaments of alumina-boria-silica composition and are commercially available from the 3M Company. Further details of the fibers and their composition and characteristics are set forth in *Design News* magazine in the May 10, 1976 issue. These fibers are there stated to withstand continuous usage temperatures of 2600° F.

The cloth of the surface layer C, once woven, is attached to the hot face 20 by any suitable technique, such as, for example, by being sewn thereto with fibers of the type from which the cloth is woven. When so attached, the surface layer of cloth effectively retains the underlying fibers of the blanket L with the block B so that the high velocity furnace gases do not carry the fibers away and erode the block B. Further, any fibers which might devitrify are in a like manner protected from the high velocity furnace gases and possible eroding action of such gases. The block B, when formed in the manner set forth above, is then attached to the wall of the furnace or high-temperature equipment in the manner set forth in Applicant's parent application previously referenced, now U.S. Pat. No. 3,952,470.

In addition to the first embodiment set forth above, the invention may take the form of several other embodiments. In such embodiments, like structure performing like functions bears like reference numerals.

For example, second embodiment B-1 (FIG. 2) of a modular insulating block, a refractory fiber blanket L-1, formed from a single piece of suitable ceramic fiber insulating material, is first folded to form an inner surface portion 120*c* which is exposed along an interior insulation surface 120, or "hot face," to interior conditions in the high temperature equipment. Side surface portions 120*a* and 120*b* of the blanket L-1 extend outwardly from each end of the inner surface portion 120*c* toward the wall of the furnace to a fold 22 formed therein for receiving a support S in the manner previously set forth. Inner wall member portions 122 adjacent the side surface portions 120*a* and 120*b*, respectively, extend inwardly from the fold 22 to an interior surface 124 of the inner surface portion 120*c* opposite the insulation surface 120 thereof.

The inner wall member portions 122 and the side surface portions 120*a* and 120*b*, respectively, may, if desired, be needled together in the manner set forth above. The block B-1 has suitable attachment structure, in a like manner to the block B, by which it may be mounted to the furnace wall in a like manner to either the block B, or in the manner disclosed in co-pending U.S. patent application No. 603,391, now U.S. Pat. No. 4,001,996 identified above.

A large mass of bulk ceramic fiber 130, or other lower temperature rated insulation refractory material of lower cost, is placed in an enclosure or pocket formed by surfaces 132 of the inner wall member portions 122, the interior surface 124 of the inner surface portion 120*c*, and the attachment structure which attaches the insulating block B-1 to the wall of a furnace. This bulk material may be contained temporarily in a plastic or fiber container which burns and is consumed when the insulating block is exposed to the heat of the furnace. Where desired, fiber insulating board or mats may be used in place of the mass 130 of bulk ceramic fibers, as set forth in U.S. patent application Ser. No. 603,391, now U.S. Pat. No. 4,001,996 previously referenced.

Further, the block B-1, in a like manner to the block B has a surface layer of cloth C of the type set forth above attached thereto in the manner set forth above. As set forth, the surface layer of cloth C retains the underlying short staple of fibers therewithin and prevents erosion of such fibers.

Figure 3:
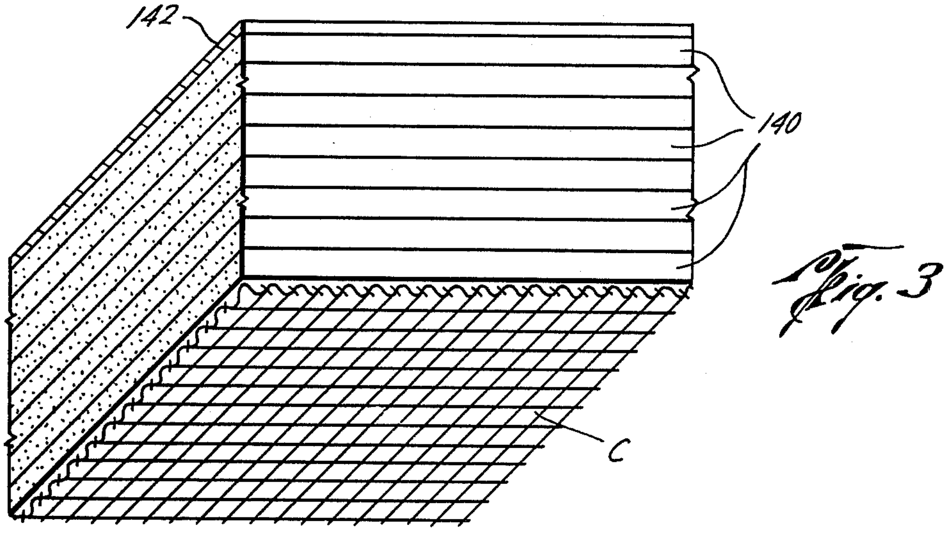

The present invention is further adapted for use with layered refractory fiber blanket furnace insulation. In FIG. 3, a plurality of layers 140 of refractory fiber blanket are shown mounted in a substantially parallel relationship with a wall 142 of the furnace. It should be understood that the number of layers 140 shown in FIG. 3 is by way of example and that fewer or more layers may be used, based on insulation requirements and other factors. The layers 140 may, for example, be attached with the wall 142 in the manner set forth in U.S. Pat. No. 3,523,395, or by other suitable techniques. When so attached, a surface layer of cloth C is attached thereto in the manner set forth above. When so attached, the cloth C retains the fibers of the layers 140 therein, protecting them from the erosive effects of the high velocity furnace gases.

Although the present invention is described in the preferred embodiment as insulating a furnace or forming a furnace wall, it should be understood that the apparatus of the present invention is also suitable to insulate or form cryogenic, or low temperature equipment, as well.

It should further be understood that, in addition to the blocks B and B-1 set forth above, other insulating blocks of the type set forth in allowed co-pending U.S. patent application Ser. No. 603,391, now U.S. Pat. No. 4,001,996, may be modified or repaired according to the present invention. Accordingly, the structure of the remaining blocks of such applications are herein incorporated by reference. Furthermore, it should be understood that previously installed refractory fiber blanket insulating blocks or layered installed may be modified or repaired by having the cloth C attached thereto in accordance with the present invention.

The foregoing disclosure and description of the invention are illustrative and explanatory thereof, and various changes in the size, shape, and materials as well as in the details of the illustrated construction may be made without departing from the spirit of the invention.

I claim:

1. A modular refractory fiber insulating block comprising:

(a) an insulating refractory fiber blanket folded into a plurality of adjacent layers of refractory fiber insulating material and having folds formed between said adjacent layers alternately at outer and inner ends thereof, respectively;

(b) means for attaching said insulating blanket to the wall of the furnace, said means for attaching including a support member mounted in at least one of said outer folds;

(c) said insulating blanket further including inner end portions connecting adjacent layers of said blanket at inner ends thereof to form said inner folds, said inner end portions having fibers transversely disposed to the direction of the heat flow towards the furnace wall to increase the insulating capacity of said insulating block; and (d) said insulating block having attached to the hot face surface thereof a layer of cloth formed from fibers of metal oxides to prevent erosion of the refractory fibers in said insulating blanket.

2. The structure of claim 1, wherein said cloth is attached to said hot face surface by means of thread sewing said cloth to said refractory fiber blanket.

3. The structure of claim 1, wherein said cloth is formed from continuous fibers of metal oxides.

4. A modular refractory fiber insulating block comprising:

(a) an insulating blanket of refractory fiber insulating material folded into a plurality of folds of adjacent layers;

(b) means for attaching said folded insulating blanket to the wall of the furnace; and (c) said insulating block having attached to the hot face surface thereof a layer of cloth formed from fibers of metal oxides to prevent erosion of the refractory fibers in said insulating blanket.

5. The structure of claim 4, wherein said means for attaching includes a support member mounted within said block.

6. The structure of claim 5 wherein said blanket comprises:

(a) an inner surface portion exposed along an insulation surface to the interior of the furnace;

(b) a side surface portion extending outwardly from said inner surface portion at an end thereof to a fold formed therein for receiving said support member; and (c) an inner wall member portion mounted inside said side surface portion extending inwardly from said fold formed in said side surface portion to an interior surface of said inner surface portion opposite said insulation surface thereof, wherein said blanket surrounds said support member within said block to protect said support member from heat and corrosive substances.

7. The structure of claim 4, wherein said cloth is formed from continuous fibers of metal oxides.

8. The structure of claim 7, wherein said cloth is formed from continuous fibers of alumina, boria and silica composition.

9. The structure of claim 4, wherein said refractory fiber blanket is formed into a plurality of layers mounted in a substantially parallel relationship with the wall of the furnace.

10. The structure of claim 4, wherein said cloth is attached to said hot face surface by means of thread sewing said cloth to said refractory fiber blanket layers.

11. The structure of claim 10, wherein the thread is formed from continuous fibers of alumina, boria and silica composition.

12. The structure of claim 10, wherein the thread comprises continuous fibers of the same material that comprises said cloth.

* * * * *